United States Patent [19]

Falconieri

[11] Patent Number: 4,498,792
[45] Date of Patent: Feb. 12, 1985

[54] PRINTING AND/OR CORRECTING DEVICE FOR PRINTING MACHINES

[75] Inventor: Remo Falconieri, S.Giorgio C., Italy

[73] Assignee: Ing. C. Olivetti & C., S.p.A., Ivrea, Italy

[21] Appl. No.: 367,003

[22] Filed: Apr. 9, 1982

Related U.S. Application Data

[63] Continuation of Ser. No. 58,201, Jul. 17, 1979, abandoned.

[30] Foreign Application Priority Data

Jul. 18, 1978 [IT] Italy ............................... 68696 A/78

[51] Int. Cl.³ .......................................... B41J 35/22
[52] U.S. Cl. .................... 400/214; 400/208; 400/212; 400/225; 400/229; 400/236.1; 400/248; 400/538; 400/697.1
[58] Field of Search .................. 400/144.2, 207, 208, 400/212, 214, 216.1, 225, 229, 236, 236.1, 236.2, 247, 248, 538, 540, 616.2, 645.1, 696, 697, 697.1, 709.1

[56] References Cited

U.S. PATENT DOCUMENTS

| | | | |
|---|---|---|---|
| 733,851 | 7/1903 | Koch | 400/645.1 X |
| 1,046,711 | 12/1912 | Alexander | 400/236 X |
| 2,407,799 | 9/1946 | Ritzert | 400/225 |
| 3,017,981 | 1/1962 | Keith | 400/248 |
| 3,095,079 | 6/1963 | Morelli et al. | 400/709.1 X |
| 3,159,263 | 12/1964 | Goreham | 400/616.2 X |

(List continued on next page.)

FOREIGN PATENT DOCUMENTS

| | | | |
|---|---|---|---|
| 1046074 | 12/1958 | Fed. Rep. of Germany | 400/248 |
| 2337626 | 4/1974 | Fed. Rep. of Germany | 400/208 |
| 2509839 | 9/1975 | Fed. Rep. of Germany | 400/208 |
| 2616345 | 10/1977 | Fed. Rep. of Germany | 400/248 |
| 2757993 | 6/1979 | Fed. Rep. of Germany | 400/208 |
| 2306836 | 11/1976 | France | 400/208 |
| 440116 | 12/1935 | United Kingdom | 400/248 |
| 1071959 | 6/1967 | United Kingdom | 400/697.1 |
| 2030076 | 4/1980 | United Kingdom | 400/225 |

OTHER PUBLICATIONS

IBM Technical Disclosure Bulletin, "Card Holder for Correcting Typewriter", Buckley et al., vol. 15, No. 11, Apr. 1973, p. 3395.
IBM Technical Disclosure Bulletin, "Ribbon Cartridge", Mathews, vol. 18, No. 11, Apr. 1976, p. 3538.
IBM Technical Disclosure Bulletin, "Erase Ribbon Lift and Advancing Mechanism", Mathews, vol. 19, No. 7, Dec. 1976, pp. 2393–2394.
IBM Technical Disclosure Bulletin, "Two-Color Cartridge Ribbon System with Correction", Schaefer, vol. 22, No. 6, Nov. 1979, pp. 2327–2329.

*Primary Examiner*—Ernest T. Wright, Jr.
*Attorney, Agent, or Firm*—Banner, Birch, McKie & Beckett

[57] ABSTRACT

The printing and correcting device is applied to a daisywheel printer and comprises a frame supporting a cartridge for a typing ribbon and a correcting ribbon arranged below the typing ribbon. The frame is able to swing as the result of operation of an electromagnet, from a rest position providing visibility of the print, to an intermediate position for printing the characters. A second electromagnet raises the frame through a greater length of travel in order to position the correcting ribbon in front of the printing point. A rotating electromagnet causes automatic unidirectional advance of the typing ribbon after each character has been printed. The correcting ribbon is wound between two spools and its motion is provided by means of a pawl which engages with a gear wheel for driving the spool only in the case where the path of travel of the frame is greater than that which relates to positioning of the typing ribbon.

A paper finger in the form of a sheet of limited thickness is provided with a cut out portion corresponding to the printing point, and with a guide in the form of a leaf spring for guiding the two ribbons adjacently to the typing paper when they are being raised and for preventing unwanted contact by these.

32 Claims, 9 Drawing Figures

U.S. PATENT DOCUMENTS

| | | | |
|---|---|---|---|
| 3,707,214 | 12/1972 | Ponzano | 400/144.2 |
| 3,747,734 | 7/1973 | Norman et al. | 400/697.1 |
| 3,866,736 | 2/1975 | Ozimek et al. | 400/697 |
| 3,872,960 | 3/1975 | Gabor | 400/225 X |
| 3,904,017 | 9/1975 | Frechette | 400/214 X |
| 3,905,465 | 9/1975 | Frechette et al. | 400/214 |
| 3,927,746 | 12/1975 | Wolowitz | 400/208 |
| 3,964,595 | 6/1976 | Edstrom | 400/248 |
| 3,983,985 | 10/1976 | Guerrini et al. | 400/144.2 |
| 4,010,839 | 3/1977 | Guerrini et al. | 400/207 |
| 4,020,940 | 5/1977 | Daley et al. | 400/208 |
| 4,036,348 | 7/1977 | Guerrini | 400/144.2 |
| 4,053,042 | 10/1977 | Hess | 400/248 X |
| 4,071,134 | 1/1978 | Humphrey | 400/697.1 |
| 4,088,218 | 5/1978 | Depew | 400/208 |
| 4,172,672 | 10/1979 | Oddicini et al. | 400/697.1 X |
| 4,203,677 | 5/1980 | Hatsell | 400/208 X |
| 4,247,210 | 1/1981 | Kacmarcik et al. | 400/236.1 |
| 4,347,007 | 8/1982 | Schaefer | 400/208 |

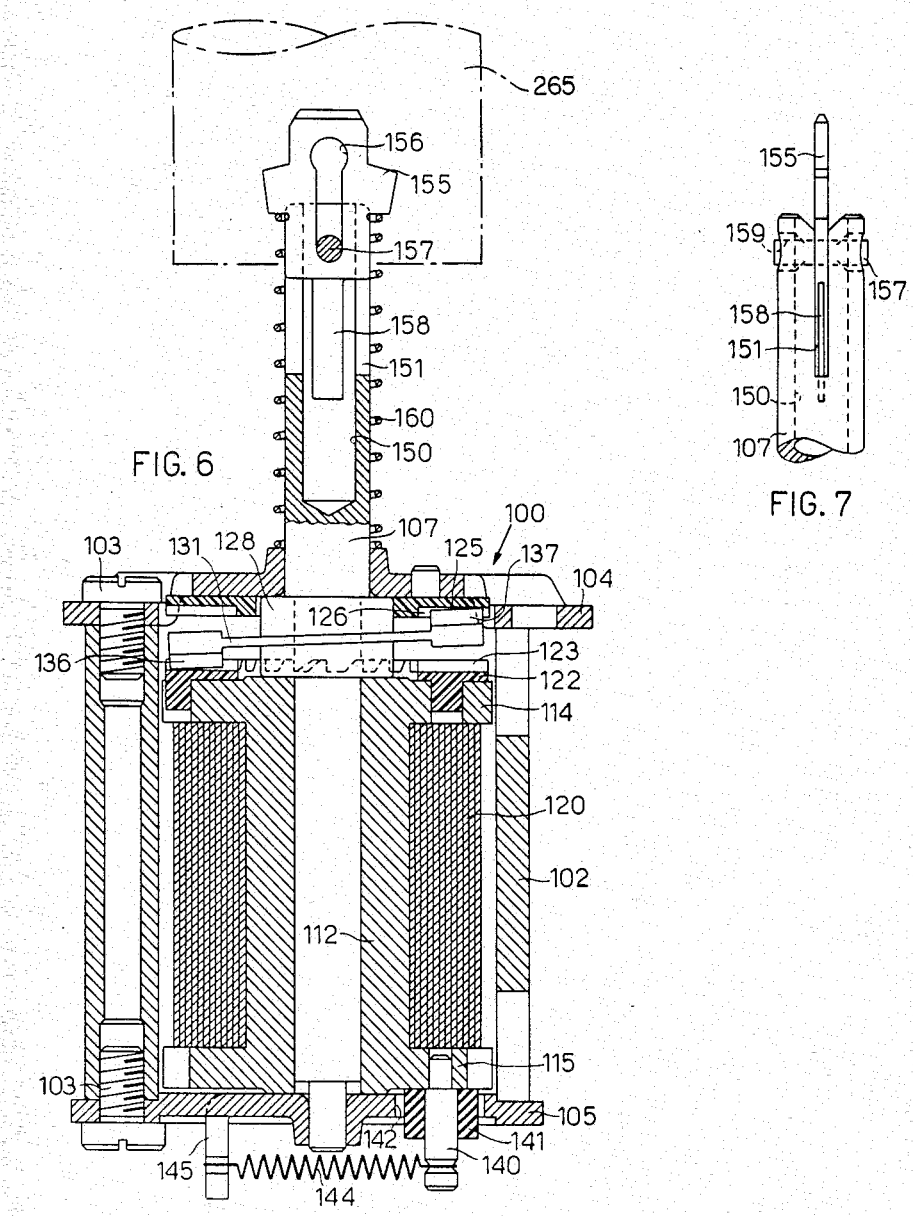

PRINTING AND/OR CORRECTING DEVICE FOR PRINTING MACHINES

This is a continuation of application Ser. No. 058,201, filed July 17, 1979, now abandoned.

BACKGROUND OF THE INVENTION

The present invention relates to a printing and/or correcting device for printing machines, in particular of the type having electronic control.

Printing and/or correcting devices for typewriters are already known, but these are generally somewhat slow in operation and complicated.

SUMMARY OF THE INVENTION

A first aim of the present invention is to provide a device which is simple, fast and has great ease of use, in particular for printing machines of the electronic type.

A second aim of the invention is to provide a correcting device which can be used in printers in which the printing unit is very close to the platen. This is the case when the printing unit is for example made up by a character-bearing disc with flexible laminae.

A third aim of the invention is to provide a printing and/or correcting device, in which the forward motion of the corresponding ribbon takes place in a simple, reliable manner using inexpensive means.

BRIEF DESCRIPTION OF THE DRAWING

A preferred embodiment of the invention is given in the description which follows which is provided by way of non-limiting example with reference to the attached drawing in which:

FIG. 6 is a cross-section of some individual parts shown in FIG. 3;

FIG. 7 is a front view of some individual parts shown in FIG. 6;

DESCRIPTION OF A PREFERRED EMBODIMENT

PRINTING MECHANISM

Figure 1:
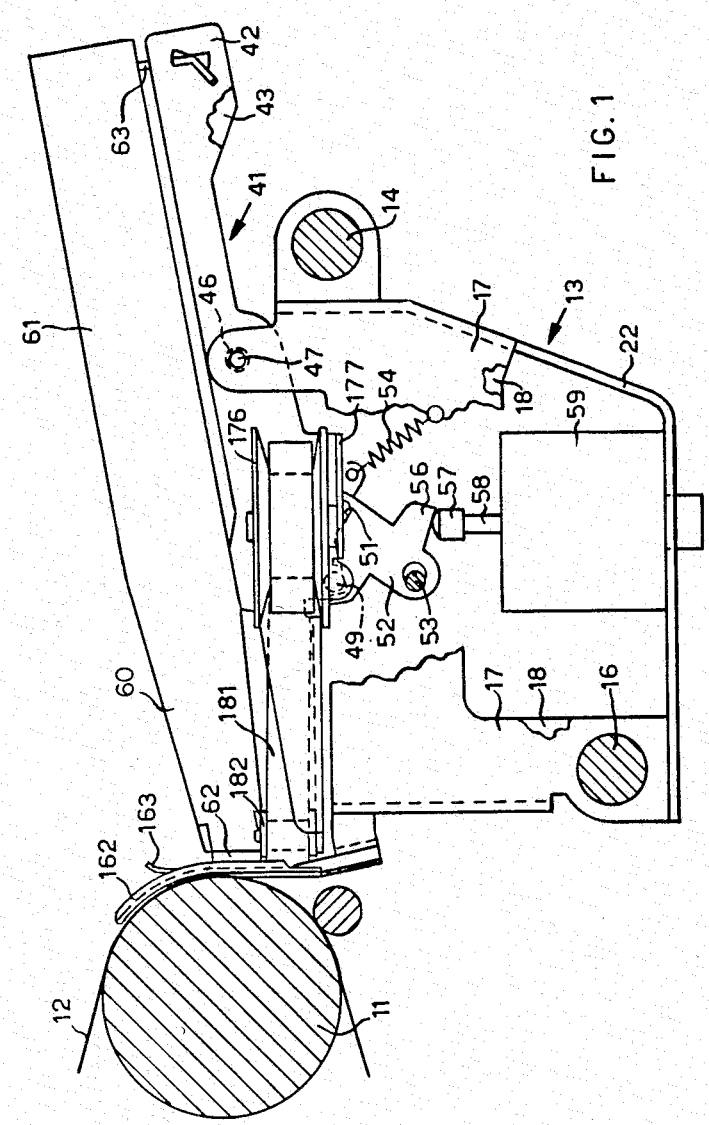
FIG. 1 shows a first partial cross-section of a printing machine.
Figure 3:
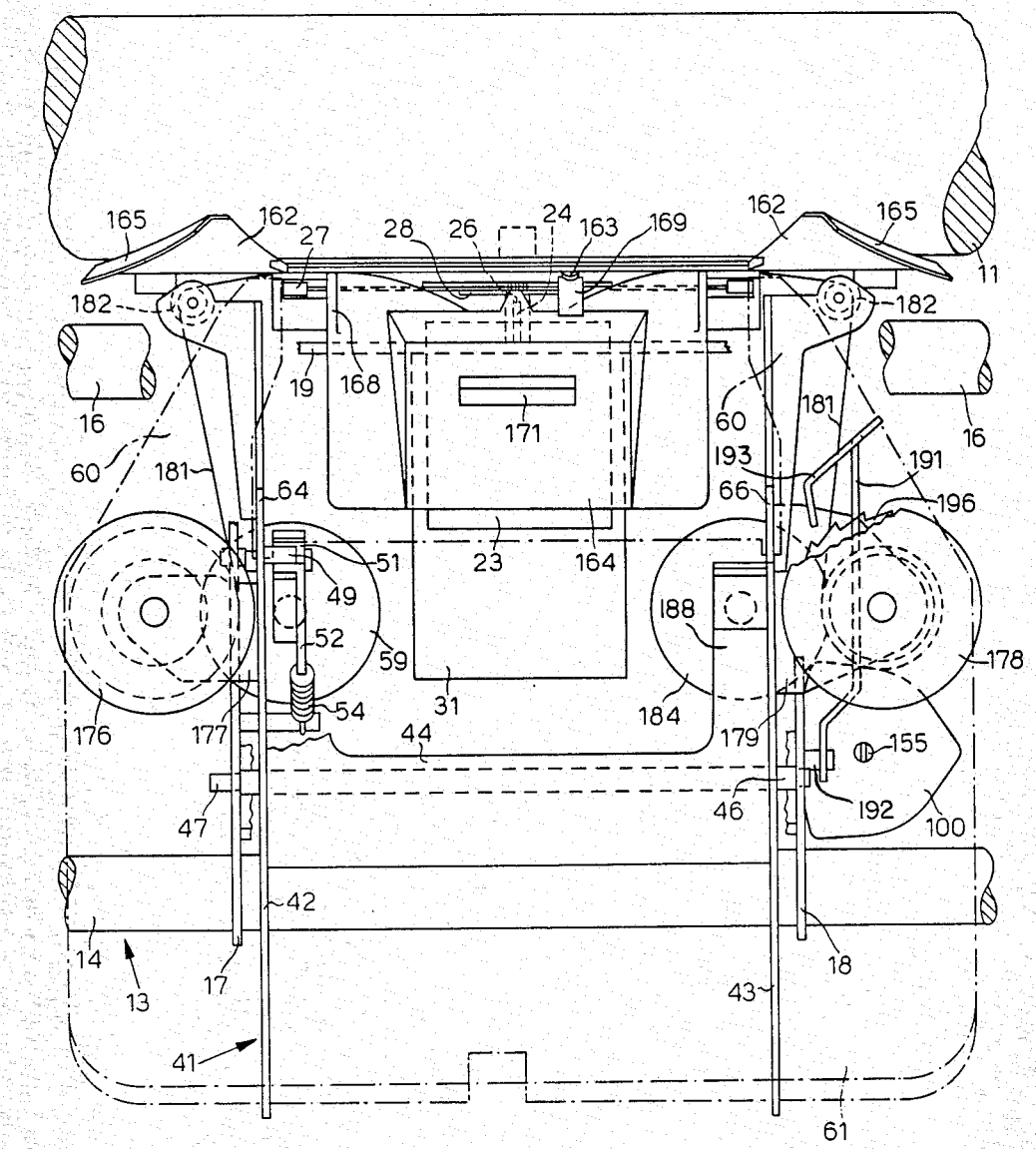
FIG. 3 is a partial plan view of the machine shown in FIGS. 1 and 2.

The printing device comprises a platen 11 for the typing paper 12 (FIG. 1) and a carriage 13 which can be moved transversely across the sheet of typing paper 12 along two guides 14 and 16. The carriage 13 is slidable on guides 14 and 16 in the two directions, for example as described in the U.S. Pat. No. 3,707,214. The carriage 13 is made up by side pieces 17 and 18, and a baseplate 22. An electromagnet 23 (FIG. 3), fixed to an upright 19, pivoting on the guide 16 carries a striker bar 24 having a shaped end 26 which cooperates with a character-bearing disc 27.

The character-bearing disc 27 is made of plastics material and is fixed to a flange 28 of a selector shaft 29 (FIG. 2), as described in the U.S. Pat. No. 4,036,348. The selector shaft 29 is rotatable by means of an electric motor 31 fixed to the upright 19. The character-bearing disc 27 is of daisy-wheel type with flexible laminae 32 (FIG. 4) carrying print characters 33. Each lamina 32, on the opposite face to that carrying the character 33 is provided with a fine positioning wedge 34 which is designed to cooperate with a complementary notch in the end 26 (FIG. 3) of the striker bar 24.

Selection of the character 33 to be printed is carried out by means of the motor 31 in a known manner, for example as described in the U.S. Pat. No. 3,983,985.

PRINTING RIBBON MECHANISM

A frame 41 (FIG. 3) is mounted on the carriage 13 and consists of two side plates 42,43, a central plate 44, and a sleeve 46 by means of which frame 41 pivots on a shaft 47 of the carriage 13. A spring 48 normally keeps the frame 41 rotated in the anti-clockwise sense in FIG. 2, arrested by means of a pin 49 (FIG. 3) sliding in a slot 51 of a cam 52 of the carriage 13.

Figure 5:
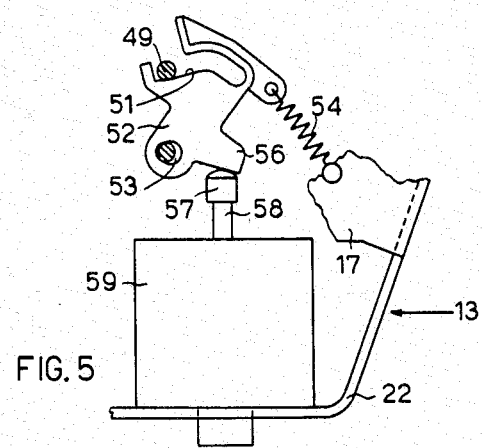
FIG. 5 is a side view giving details of some parts shown in FIG. 1.

The cam 52 (FIG. 5) is mounted on an eccentric 53 of the carriage 13 and, under the bias of a spring 54, is normally rotated in the clockwise sense and is arrested by means of a projection 56 against the end portion 57 of the plunger 58 of a solenoid 59 fixed to the carriage 13. The cam 52 reduces the stroke of the pin 49 with respect to the stroke of the plunger 58. The slot 51 is so shaped as to cooperate with the pin 49 when raising the printing ribbon 62 to the printing point and is open at one side in order to allow the pin 49 to pass out from it when the ribbons 62 and 181 are raised higher to bring the correcting ribbon 181 to the printing point.

A cartridge 61 (FIG. 2), for the printing ribbon 62 is substantially identical to that described in U.S. Pat. No. 4,010,839 and comprises two arms 60 for guiding a portion of the printing ribbon 62 external to the cartridge 61. The cartridge 61 is mounted on the frame 41 and is detachably held in position by a leaf spring 63 acted on by a tension spring 65, holding the cartridge 61 against two shoulders 64 and 66 (FIG. 3) which projects from the side plates 42 and 43 respectively.

The printing ribbon 62 can be of the non-reusable carbon type or correctable type or of the fabric type operating in a closed loop. In each case a device 100 (FIGS. 3 and 6) provides for advance in one direction only of the printing ribbon 62, contained in the cartridge 61. Device 100 comprises a cylindrical stator 102 constructed of a ferromagnetic material, for example sintered iron, fixed to a side 18 of the carriage 13. The stator 102 has fixed to it, by means of screws 103, an upper flange 104 and a lower flange 105 of a non-magnetic material, for example stainless steel, in which a shaft 107 is mounted, which is rotatable coaxially in the stator 102.

Inside the stator 102, which is designed in such a way as to have three pole pieces 108, 109, 110 (FIG. 8), a rotor 112 of ferromagnetic material is provided, which is rotatably mounted with respect to the shaft 107. The rotor 112 is shaped so that two flanges 114 and 115 are provided (FIG. 6) which each have three pole pieces 116, 117 and 118 (FIG. 8) which are associated with the pole pieces 108, 109 and 110 respectively of stator 102. A winding 120 is provided between the two flanges 114 and 115 (FIG. 6), and this can be selectively energised in order to produce magnetic flux between the pole pieces 108, 109 and 110 and the pole pieces 116, 117 and 118.

A disc 122 of plastics material (FIGS. 6 and 8) is fixed on to the flange 114 of the rotor 112 and has frontal teeth 123 for unidirectional transmission of motion.

A disc 125, also of plastics material, is fixed on the upper flange 104 of stator 102, and has surface teeth 126 which face the teeth 123 of disc 122. The teeth 126 are also orientated so as to only allow transmission of motion in one sense only. A part 128 of plastics material is interposed between the discs 122 and 125 and is provided with a central bush 130 which is fixed to the shaft 107 and a peripheral ring 131, which is inclined with respect to the discs 122 and 125, and is connected to the central bush 130 by means of two radiating arms 132 and 134.

The peripheral ring 131 of part 128 has teeth 136 formed on its lower portion, which normally engage with the teeth 123 of disc 122 and is also provided with teeth 137 at its upper portion, which are diametrically opposed to teeth 136 and which normally engage with the teeth 126 of the disc 125.

Figure 9:
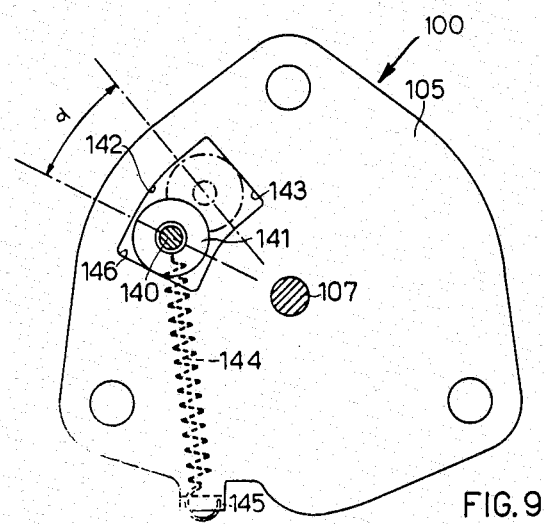
FIG. 9 is a view partly in cross-section and from below of some details of FIG. 6.

A stud 140 (FIGS. 6 and 9), carrying a rubber bush 141, is fixed to the flange 115 of the rotor 112 and projects from the stator 102 through a slot 142. A spring 144 is tensioned between a tongue 145 of the stator 102 and the stud 140 and maintains the rubber bush 141 against one wall 146 of the slot 142, thereby keeping the rotor 112 in the rest position. The rubber bush 141 is movable between the wall 146 and a wall 143 of the slot 142. The upper end portion of the shaft 107 is shaped in such a way that a cylindrical cavity 150 is provided, as well as a transverse slit 151 and a through hole 159, which is orthogonal to the slit 151 (FIGS. 6 and 7). The slit 151 houses, in a sliding manner, a blade 155, which is designed to engage with a sleeve 265 similar to the sleeve 63 shown in FIG. 2 of U.S. Pat. No. 4,010,839 mentioned above for the cartridge 61 for the forward motion of the inked printing ribbon 62. The blade 155 has a longitudinal slot 156 carrying a pivot pin 157, which is housed in the hole 159 through the shaft 107, and has a lower spigot 158 which is housed with a certain amount of play in the cavity 150. A helical spring 160 normally urges the blade 155 upwardly.

Figure 8:
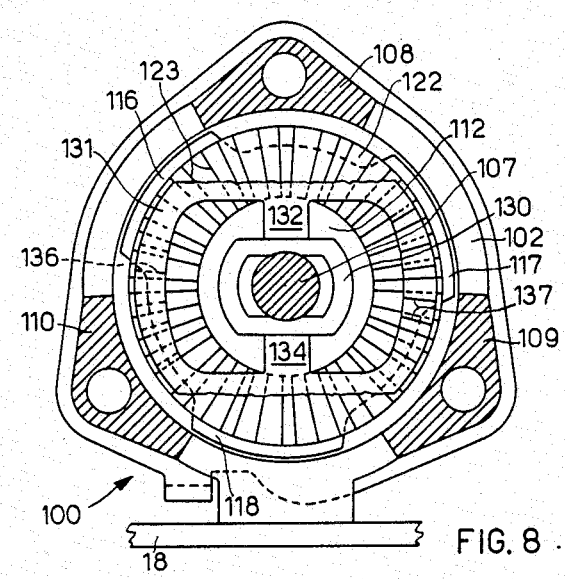
FIG. 8 is a plan view partly in cross-section of some details of FIG. 6.

Operation of the device 100 described above is as follows. In the rust position, the winding 120 is de-energised and rotor 112, acted on by spring 144 is located in a position where the pole pieces 116, 117 and 118 are offset with respect to the pole pieces 108, 109 and 110 of the stator 102 (FIG. 8). It will now be supposed that it is desired to automatically effect advance motion of the inked printing ribbon 62.

After each print of a character 33, the winding 120 is energized in any known manner, for a predetermined period of time, for example 25 msec, so as to generate magnetic flux between the rotor 112 and stator 102. Due to the effect of the magnetic flux, the pole pieces 116, 117 and 118 of rotor 112 become displaced into alignment with the pole pieces 108, 109, 110 respectively of the stator 102, thus providing for clockwise rotation of the rotor 112 with respect to the stator 102. The extent of the rotation is determined by the rubber bush 141 (FIG. 9) which comes into abutment against the wall 143 of the slot 142; the angle of rotation of rotor 112 is for example about 24°.

Due to the orientation of the teeth 123 of disc 122, and the teeth 126 of disc 125 (FIGS. 6 and 8), the part 128, and consequently shaft 107 also, are caused to rotate. As a result of this the sleeve 265, which is engaged by the blade 155, causes advance motion of the inked printing ribbon 62.

The winding 120 is then de-energized and spring 144 brings the rotor 122 back to the rest position. During this rotation (in the anti-clockwise sense in FIG. 8), the shaft 107 is not forced to move since the orientation of the teeth 126 of the disc 125 prevent rotation in the anti-clockwise sense of the part 128. Raising and lowering of cartridge 61 is followed by the blade 155, which is biased by means of the spring 160.

Figure 4:
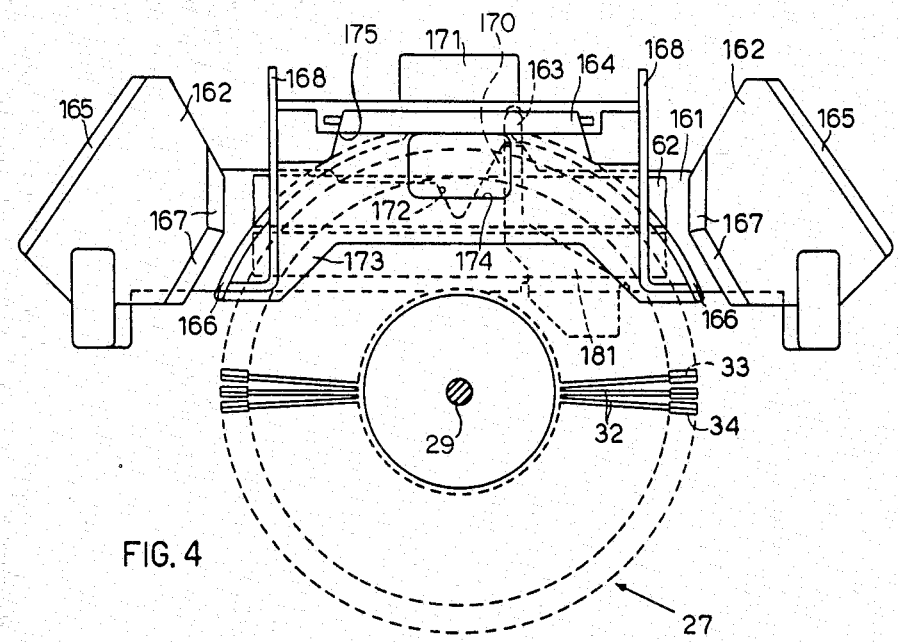
FIG. 4 is a partial front view of some parts shown in FIG. 3.

A paper guide which is made up by an element 161 of flexible sheet metal (FIG. 4) and by two parts 162 of transparent plastics material arranged at the sides of the sheet metal element 161, is fixed to the carriage 13. The paper guide element 161 is disposed adjacent to the platen II (FIG. 1) and holds the typing paper 12 against the platen 12. The paper guide element 161 (FIG. 4) comprises, on the side opposite the typing paper 12, a leaf spring 163, which is arranged vertically at the side of the point of printing, and is designed so as to guide the external portion of the printing ribbon 62 and the correcting ribbon 181 between the character-bearing disc 27 and the element 161. The parts 162 in plastics material are arranged below and above the sheet metal element 161 and are provided with wings 165 and 167 which prevent the paper guide from catching on the edges of the typing paper 12. The paper guide element 161 of sheet metal is provided with a V-shaped notch 172 arranged in front of the point of printing in order to limit the area of contact of the printing ribbon 62 and of the correcting ribbon 181. A V-shaped projecting part 170 is arranged adjacent to the V-shaped notch 172, and is aligned with the leaf spring 163 (as can be seen in FIG. 4) in order to prevent contact between the printing ribbon 62 and the typing paper 12, during the correcting operation.

A cover 164 for the electromagnet 23 providing striking is fixed to the upright 19 and comprises a semi-circular shaped part 166 (FIG. 4) which has the purpose of shielding and protecting the upper part of the character-bearing disc 27. The cover 164 further includes a housing 175 for the electromagnet 23 which covers the space existing inside the cartridge 61 so as to prevent extraneous objects from entering between the character-bearing disc 27, platen 11 and electromagnet 23. The cover 164 includes two lateral guides 168 which are coplanar with the semicircular part 166, and which keep the printing ribbon 62 parallel to the platen 11, a shoulder 169 (FIG. 3), which is designed to cooperate with the leaf spring 163 in order to keep the ribbons 62 and 181 parallel to the character-bearing disc 27 and finally a hand grip 171 (FIG. 4), for rotating the character-bearing disc 27, motor 31 and electromagnet 23 from the print position to an inclined rest position, so that the character-bearing disc 27 can be changed after the cartridge 61 has been removed. In front of the paper guide element 161, the cover 164 is provided with a wall 173, having a hollow portion 174, corresponding to the V-shaped notch 172, which protects the front part of disc 27 and allows passage to the striker bar 24.

Operation of the solenoid 59 is as follows. In each print cycle, the solenoid 59 (FIG. 1) is energized and the plunger 58 is raised and its end portion 57 causes the cam 52 to rotate in the anticlockwise sense against the action of spring 54. The eccentric 53 with the slot 51 (FIG. 5) raises the pin 49 and consequently the frame 41 as well, this being opposed by the action of spring 48

Figure 2:
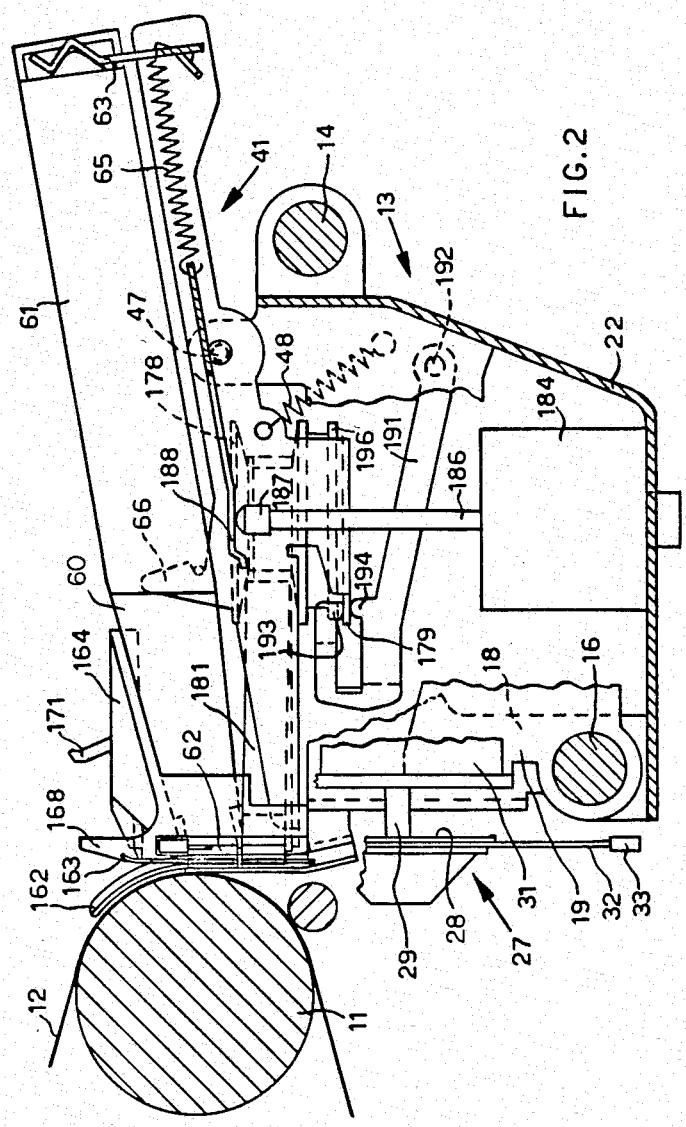
FIG. 2 is a second partial cross-section of the machine shown in FIG. 1.

(FIG. 2). The frame 41 (FIG. 1) rotates in the clockwise sense and raises the cartridge 61 in order to position the printing ribbon 62 in the corresponding position for print. When the solenoid 59 is deenergized, the springs 48 and 54 bring the frame 41 back to the rest position, and the cartridge 61 and the cam 52 as well. With the cartridge 61 in the rest position, the operator is able to read the characters which have been written corresponding to the line of print. The particular shaping of slot 51 has the effect of preventing the frame 41 from being raised when the solenoid 59 raises its plunger 58 beyond the position of the point at which the character is being printed or oscillating about this particular point. It is possible for the solenoid 59 to be kept in the energized state by means of a current which is less than the initial current in order to keep the frame 41 and cartridge 61 in the raised position for repeated print cycles.

CORRECTING RIBBON MECHANISM

The correcting ribbon device comprises a feed spool 176 (FIG. 3), which is rotatably mounted on a plate 177 of the side plate 42, and a take-up spool 178, which is rotatably mounted on a plate 179 of the side plate 43. The correcting ribbon 181, which may be of the lift-off type, or of the cover-up type, is guided between the two spools 176 and 178 by two ribbon guides 182, leaf spring 163 and by the semicircular shaped part 166 of the cover 164, so as to ensure that the correcting ribbon 181 remains arranged below the printing ribbon 62 and parallel both to the ribbon 62 and to the platen 11. The shaped part 166 furthermore prevents interference between the disc 27 and the ribbon 181.

A solenoid 184 (FIG. 2), which has characteristics which are substantially identical to those of the solenoid 59, includes a plunger 186 having an end portion 187 against which a shoulder 188 of frame 41 is normally held under the influence of the spring 48. The plunger 186 (FIG. 3) has the same stroke as the plunger 58 and operates on the shoulder 188, while the plunger 58 operates on the pin 49 through the cam 50 which reduces the stroke of the plunger 58. A ratchet lever 191 pivots on a pivot pin 192 of the carriage 13 and is guided by means of two shoulders 193 (FIG. 2) and 194 on the plate 179 in order to cooperate with a ratchet wheel 196 connected to the take-up spool 178.

Operation of the correcting ribbon device is as follows. The solenoid 184 is energized, whereby the plunger 186 and the end portion 187 raise the shoulder 188, causing the frame 41 to rotate in the clockwise sense against the action of the spring 48. The frame 41 consequently raises the cartridge 61, spools 176 and 178, printing ribbon 62 and correcting ribbon 181, up to the point where the correcting ribbon 181 is located at the point of print. The printing ribbon 62 is consequently raised beyond its normal operating position. The two ribbons 62 and 181 are still guided by the leaf spring 163 and the guide 168 which take the place of the shaped part 166 when guiding the correcting ribbon 181.

During this raising operation, the ratchet lever 191, pivoting on the pivot pin 192 fixed to the carriage 13, engages the ratchet wheel 196 via shoulder 193 and causes the take-up spool 178 to rotate in the anti-clockwise sense, thus causing the correcting ribbon 181 to advance. When the solenoid 184 is de-energized, the spring 48 brings the frame 41 together with cartridge 61 and spools 176 and 178 carrying the ribbons 62 and 181 back to the rest position.

Among possible modifications, the raising of the frame 41 could be carried out in a different manner to that which has been described. For example, one of the solenoids could provide for the raising of the frame 41 from the rest position up to a first print position, whilst the other electromagnet could provide for a subsequent raising of the frame 41 to achieve the correcting position. However in the embodiment described, the solenoids have identical strokes but the lift given by the solenoid 59 is reduced by the mechanism illustrated in FIG. 5.

The leaf spring 163 and the guide 166 and/or 168 could be used in printers which differ from the one which has been described, but in which the distance between the printing element and the sheet of paper is as restricted as it is here. A typical example is printers using styli or wires. The necessary modifications to the spring 163 and to guides 166 will be readily accessible to these skilled in the art.

The embodiments of the invention in which an exclusive property or privilege is claimed are defined as follows:

1. A printing and correcting device for printing machines comprising a platen including a printing point; a support structure for supporting a printing field and a correcting field and locating the correcting field beneath the printing field; means supporting said support structure to move the printing field and the correcting field from a rest position allowing the printing point to be seen to a printing position, locating the printing field in front of the printing point for the printing of characters and to a correcting position locating the correcting field in front of the printing point for the correcting of printed characters; spring means to hold the support structure in the rest position; first and second electromagnetic actuators each actuatable from an inoperative state through a substantially identical working stroke for moving the support structure to the printing and the correcting position, respectively; and means selectively connecting said first electromagnetic actuator with said support structure for converting the working stroke of the first electromagnetic actuator to the movement of the support structure to the printing position in the inoperative state of the second electromagnetic actuator and for releasing said support structure from said first electromagnetic actuator in the inoperative state of the first electromagnetic actuator and in the operative state of the second electromagnetic actuator, wherein said connecting means comprise an element of said support structure and a cam cooperative with said element for moving said support structure from the rest position to the printing position against the action of said spring means, wherein said element releases said cam in the correcting position of the support structure, and wherein said cam comprises a slot cooperative with said element for positively positioning the support structure in said printing position without ribbon oscillation with respect to the printing point during the operative state of said first electromagnetic actuator.

2. A device according to claim 1, wherein the correcting field is advanced by a mechanism in response to only the movement of the support structure to the correcting position.

3. A device according to claim 1, wherein the support structure supports a cartridge for the printing field and spools for the correcting field.

4. A correcting device according to claim 1, wherein said printing machines comprise a printing unit of the type having a character-bearing disc with flexible laminae, and wherein said support structure maintains said printing and correcting fields between said disc and said platen.

5. A device according to claim 4, wherein said first and second electromagnetic actuators cause the fields to raise from a rest position in which the printed characters are visible to a working position in which the printing or deletion may be actuated, further comprising a guide part for maintaining said fields adjacent to the platen when said fields are raised by the support structure.

6. A device according to claim 5, further comprising a paper finger plate arrangement including a cut-out portion in front of the printing point and a projection adjacent to said cut-out portion and substantially aligned with said guide part for limiting the region of contact of said fields for deletion or for printing with a sheet of paper and for preventing contact of the printing field with the sheet of paper during the correcting operation.

7. A device according to claim 4, further comprising a paper finger plate arrangement including a central metal portion of limited thickness and two transparent side portions provided with edges in order to facilitate reciprocal displacement between the printing point and the platen.

8. A device according to claim 7, further comprising a guide part for maintaining said fields adjacent to the platen when said fields are raised by said support structure and wherein said guide part comprises a lamina which is fixed onto the central metal portion of said finger plate arrangement.

9. A device according to claim 7, further comprising a support frame swingable in a differentiated manner through smaller and larger amounts for the printing and correcting fields and an advancing mechanism comprises a gear wheel for driving the correcting field and a pawl disposed in front of said gear wheel and normally disengaged from said gear wheel, wherein connecting means for connecting said support frame with said advancing mechanism comprise a link reciprocating said pawl in response to the swinging of said support frame through a short and long stroke respectively associated with the smaller and larger amounts of movement of said support frame and wherein said short stroke is insufficient for engagement of the pawl with said gear wheel and wherein the long stroke causes said pawl to engage said gear wheel to advance said correcting field only in the case where the path of travel of said support frame is greater than that corresponding to the positioning of the printing field.

10. A device according to claim 8, wherein the character-bearing disc is a daisywheel type with flexible laminae carrying print characters.

11. A device according to claim 8, further comprising a screen member designed to prevent contact of the printing and correcting fields with the laminae of said disc.

12. A device according to claim 11, wherein the screen member further comprises a shoulder which cooperates with a free end of the guide part for keeping the guide part substantially parallel to the platen.

13. A device according to claim 8, wherein said guide part comprises a small bar which is substantially vertical and shaped so as to be substantially parallel to the platen.

14. A device according to claim 6, wherein the paper finger plate arrangement comprises a central metal portion and the guide part comprises a lamina fixed to the central metal portion of the paper finger plate arrangement.

15. A device according to claim 14, wherein the guide part for the fields is fixed to the paper finger plate arrangement.

16. A printing and correcting device for printing machines comprising a platen including a printing points a single support structure for supporting a printing field and a correcting field and locating the correcting field beneath the printing field; means supporting said single support structure to move the printing field and the correcting field from a rest position allowing the printing point to be seen to a printing position, locating the printing field in front of the printing point for the printing of characters and to a correcting position locating the correcting field in front of the printing point for the correcting of printed characters; first and second electromagnetic actuators each actuatable from an inoperative state to an operative state, wherein each of said first and second electromagnetic actuators are movable through a substantially identical working stroke for moving the single support structure to the printing and the correcting position; respectively; spring means to hold the single support structure in the rest position, and means selectively connecting each of said first and second electromagnetic actuators with said single support structure for converting the working stroke of said first electromagnetic actuator to the movement of the single support structure to the printing position in the inoperative state of the second electromagnetic actuator wherein said correcting means comprise an element of said single support structure and a cam member fulcrumed on said supporting means and cooperative with said element wherein said cam member rotates in response to the actuation of said first electromagnetic actuator in its operative state for moving said single support structure from the rest position to the printing position against the action of said spring means and wherein said cam member is enabled to release said element for the movement of the single support structure from the rest position to the correcting position, during the operative state of the second electromagnetic actuator, while the first electromagnetic actuator remains in the inoperative state.

17. A device according to claim 16, wherein said cam member has a slot cooperative with said element in order to prevent oscillation of the printing field with respect to the printing point.

18. In a correcting device for a printing unit of the type comprising a platen including a printing point, a carriage movable in front of said platen, a cartridge for a typing ribbon removably mounted on said carriage including a container for the typing ribbon having two arms for guiding an external portion of the typing ribbon externally to the container, said correcting device comprising a pair of spools on which a correcting ribbon is wound, a support frame for supporting the spools of the correcting ribbon beneath said cartridge, guide means fixed to said support frame for guiding an external portion of the correcting ribbon substantially coplanar and beneath with respect to the external portion of the typing ribbon near to the printing point, swinging means for swinging the cartridge and said support frame on said carriage to move the external portion of the typing ribbon and the external portion of the correcting ribbon from a rest position for visibility of the printing point, into a printing position for positioning said external portion of the typing ribbon in front of the printing point for the printing thereon and into a correction position for positioning said external portion of the correcting ribbon in front of the printing point for the correction of printed characters and spring means for holding the cartridge and the support frame in the rest position; the improvement comprising first and second electromagnetic actuators each actuatable from an inoperative state to an operative state through a substantially identical working stroke for positioning said external portion of the typing ribbon and of the correcting ribbon in front of the printing point, respectively; wherein one electromagnetic actuator of said first and second electromagnetic actuators is actuatable at a time while the other electromagnetic actuator remains in the inoperative state and vice-versa and converting means for selectively converting the working stoke of said first electromagnetic actuator to the movement of the cartridge for positioning the typing ribbon into the printing position in the inoperative state of the second electromagnetic actuator wherein said converting means comprise a cam follower element operatively connected with said cartridge and a cam member fulcrumed on said carriage and cooperative with said cam follower element, wherein said cam member rotates in response to the actuation of said first electromagnetic actuator in its operative state for moving said cartridge from the rest position to the printing position of the typing ribbon against the action of said spring means, wherein said cam member is enabled to release said cam follower element for the movement of the support frame from the rest position to the correcting position of the correcting ribbon, during the operative state of the second electromagnetic actuator, while the first electromagnetic actuator remains in the inoperative state, and wherein said cam member comprises a slot cooperative with said cam follower element for positively positioning the typing ribbon in said printing position without ribbon oscillation with respect to the printing point during the operative state of said first electromagnetic actuator.

19. A device according to claim 18, further comprising an advancing mechanism having a gear wheel for advancing the correcting ribbon and means connecting said support frame with said advancing mechanism including a link with a pawl disposed in front of said gear wheel and normally disengaged from said gear wheel, wherein the swinging of said support frame through said smaller and larger amounts causes a reciprocating movement of said pawl through a short and a long stroke, respectively, wherein the short stroke is insufficient for engagement of the pawl with the gear wheel and wherein the long stroke causes the pawl to engage the gear wheel to advance said correcting ribbon.

20. A printing device comprising a platen including a printing line having a printing point and supporting a sheet of paper, a type carrier disc having flexible laminae close to the sheet of paper, a support for supporting a printing ribbon and a correcting ribbon holding their active surfaces substantially coplanar and the correcting ribbon beneath the printing ribbon, means actuating said support for moving the ribbons between a region providing for visibility of said printing point and alignment with the printing point, a carriage movable parallel to the platen and a paper finger plate arrangement fixedly mounted on the carriage and including a paper guide element of limited thickness disposed adjacent to the sheet of paper and a guide part for the ribbons, wherein said paper guide element has an upper edge which extends in front of the region providing for visibility beneath the printing line and is provided with a V-shaped notch arranged in front of the printing point and with a V-shaped projecting part at a side of the printing point in order to limit the area of contact of the paper sheet with the printing ribbon and the correcting ribbon, wherein an edge of said V-shaped projecting part is aligned with an edge of the V-shaped notch, and said V-shaped projecting part protrudes above the printing line, and wherein said guide part comprises a vertical lamina which is disposed in front of said paper guide element, in alignment with the V-shaped projecting part for guiding vertically the printing ribbon and the correcting ribbon between the type carrier disc and the paper guide element and between the region providing for visibility of the printing point and alignment with the printing point, without interfering with the upper edge of said paper guide element, the type carrier disc and the sheet of paper when the correcting ribbon and the printing ribbon are moving with respect to the printing point.

21. A device according to claim 20, wherein the paper finger plate arrangement includes a central metal portion including said V-shaped notch and said V-shaped projecting part, and two transparent plastic side portions fixed to the side ends of the central metal portion and wherein said two transparent plastic side portions are provided with wings which prevent the paper guide element from catching on the edges of the sheet of paper.

22. A printing device comprising a platen including a printing point, a character-bearing disc with flexible laminae, support means for supporting an active portion of a printing ribbon and a correcting ribbon in front of the platen and holding said active portions of printing ribbon and correcting ribbon substantially coplanar therebetween, means raising said support means for raising said active portions between a region providing for visibility of said printing point and alignment with said printing point fixedly with respect to the printing point for holding said active portions near to the printing point, a carriage movable parallel to the platen, a screen member fixedly mounted on the carriage, disposed parallel to the platen and designed to prevent contact of said active portions of the printing and correcting ribbons with the laminae of said disc, and a guide bar fixedly mounted on the carriage which extends vertically in front of the character-bearing disc and disposed adjacent to and at a side of the printing point for vertically guiding the printing ribbon and the correcting ribbon between the region providing for visibility of the printing point and alignment with the printing point, very close to, but without interfering with the character-bearing disc, wherein said screen member comprises a semicircular shaped part including a peripheral rib having the purpose of shielding and protecting the upper part of the character-bearing disc and two vertical guide ribs adjacent to the periphery of said character-bearing disc which project upwardly from the semicircular shaped part substantially coplanar with the peripheral rib for holding the portions of the printing ribbon and the correcting ribbon very close to the platen and wherein said active portions of printing ribbon and said correcting ribbon are confined and guided between said guide bar in front of the printing point, the peripheral rib of said semicircular shaped part and said two guide ribs in the region adjacent to the periphery of the flexible lamina providing for visibility and enabling said active portions of printing ribbon and correcting ribbon to be raised by said support means in order to allow the flexible laminae of the disc to be disposed at a minimum distance from the platen and preventing any inteference between the character-bearing disc and said portions of printing ribbon and correcting ribbon.

23. A device according to claim 22, wherein the screen member comprises a shoulder for contacting a free end of said guide bar in order to keep the portions of the printing and correcting ribbons parallel to the character-bearing disc.

24. A device according to claim 22, wherein the printing device comprises a hammer for the striking of one of said laminae to the printing point, wherein the screen member comprises a wall disposed substantially parallel to the platen and connecting said two vertical guide ribs therebetween and provided with a hollow portion for allowing the passage of said hammer and wherein said screen member further comprises a housing for an electromagnet driving said hammer.

25. A device according to claim 22, further comprising a paper finger plate for holding a sheet of paper adjacent to the platen, wherein said paper finger plate comprises a projection part adjacent to the printing point and wherein said guide bar comprises a lamina displaced from said projection part to define a space wherein said portions of the printing and correcting ribbons are confined adjacent to the printing point.

26. A correcting device for a printing unit of the type comprising a platen including a printing point, a carriage which can be moved transversely across the platen, a printing element disposed in front of the platen, a printing ribbon, a printing ribbon cartridge containing said printing ribbon and including two arms for guiding a portion of said printing ribbon to the external of the cartridge, a single swingable frame mounting said printing ribbon cartridge to position said portion of said printing ribbon near to the printing point; first pivot means for swingably supporting said single swingable frame parallel to said platen between a rest position, a printing position and a correcting position, wherein the printing ribbon cartridge causes the printing ribbon to be positioned beneath the printing point allowing visibility of the printing point in the rest position of said single swingable frame; said correcting device comprising guide means on said single swingable frame for guiding and positioning a portion of a correcting ribbon beneath said printing ribbon; means actuatable for swinging said single swingable frame in a different manner through smaller and larger amounts to said printing position and said correcting position, in order to position said printing ribbon or said correcting ribbon, respectively, in front of said printing point; and an advancing mechanism for advancing the correcting ribbon only in response to the swinging of the single swingable frame through said larger amount, thus avoiding any advancing of said correcting ribbon in response to the swinging of said single swingable frame through said smaller amount, wherein said advancing mechanism comprises: a pair of spools rotatably supported by two side plates of said single swingable frame for advancing the correcting ribbon, a ratchet wheel rotatably connected with one of said spools for driving the correcting ribbon and having peripheral teeth thereon; second pivot means on said carriage displaced from and parallel to said first pivot means; and a lever having an end, a pawl opposite to said end and guiding parts adjacent to said pawl, wherein said end is fulcrumed on said second pivot means, and said guiding parts are positively guided by one of said guide plates for causing said pawl to be located at a side of the teeth of said ratchet wheel in the rest position of said swingable frame and to reciprocate with respect to the one of said guide plates along a trajectory parallel to the one of said guide plates in response to the swinging of said single swingable frame; wherein said pawl is normally disengaged from said teeth of the ratchet wheel when the swingable frame is swinging between the rest position and the printing position and wherein the trajectory of said pawl interferes with said ratchet wheel to cause said pawl to engage the teeth of said ratchet wheel when said swingable frame is swinging between the printing position and the correcting position in order to rotate said ratchet wheel for advancing the correcting ribbon only in response to the movement of said swinging frame between said printing position and said correcting position when said correcting ribbon is positioned in front of the printing point.

27. A printing and correcting device for printing machines comprising a platen including a printing point, and supporting a sheet of paper, a cartridge containing a typing ribbon and having two arms exposing an external portion of the typing ribbon adjacent to the printing point, a correcting ribbon, a pair of spools winding the correcting ribbon, a single support for supporting said cartridge and said spools with the correcting ribbon, wherein said single support comprises two guides for guiding a portion of said correcting ribbon beneath theexternal portion of the typing ribbon; operating means of selectively operating the printing and correcting device according to a first operating mode in which the single support is held in rest position and the printing point is made visible, a second operating mode in which the single support is constantly kept in a printing position and the external portion of the typing ribbon is kept in front of the printing point for repeated printing of more characters and a third operating mode in which said single support is alternatively moved between the rest position and a deleting position in which the correcting ribbon is kept in front of the printing point for deleting a single printed character from the sheet of paper; positioning means operated by said operating means for positively locking the single support in its printing position without ribbon oscillation with respect to the printing point during the second operating mode; first means for advancing the typing ribbon when the printing device operates in the second mode; and second means for advancing said correcting ribbon only in response to the alternate movement of said single support between the rest position and the position for deleting, wherein said positioning means enables said single support to perform its motion when deletion of the characters is being carried out, wherein said positioning means comprises spring means for holding the single support in the rest position and a positioning cam and said operating means comprises an electromagnetic actuator operating on a cam follower of said single support through said positioning cam, wherein said electromagnetic actuator is actuatable to rotate said cam for causing the single support to raise from the rest position to the printing position against the action of said spring means and wherein said positioning cam, during said second operating mode, causes said cam follower to be positively locked when repeated printing is occurring and wherein said cam follower releases said positioning cam when correction of the printed characters is being carried out.

28. A device according to claim 27, wherein said first advancing means comprise an impulse-controllable motor for providing forward motion of the typing ribbon during repeated printing and wherein said second advancing means comprise a mechanism for converting the alternate motion of the single support between the rest position and the position for deleting when correction is being carried out to a forward motion for said correcting ribbon.

29. A correcting device according to claim 27, wherein said electromagnetic actuator is actuatable in an energized state by an initial current for causing the single support to raise from the rest position to the printing position and wherein said electromagnetic actuator is held actuated by means of a holding current, which is less than said initial current.

30. A printing device according to claim 27, wherein said device comprises a daisywheel printer.

31. A printing and correcting device for printing machines comprising a platen including a printing point, and supporting a sheet of paper, a cartridge containing a typing ribbon and having two arms exposing an external portion of the typing ribbon adjacent to the printing point, a correcting ribbon, a pair of spools winding the correcting ribbon, a single support for supporting said cartridge and said spools with the correcting ribbon, wherein said single support comprises two guides for guiding a portion of said correcting ribbon beneath the external portion of the typing ribbon; operating means for selectively operating the printing and correcting device according to a first operating mode in which the single support is held in rest position and the printing point is made visible, a second operating mode in which the single support is constantly kept in a printing position and the external portion of the typing ribbon is kept in front of the printing point for repeated printing of more characters and a third operating mode in which said single support is alternatively moved between the rest position and a deleting position in which the correcting ribbon is kept in front of the printing point for deleting a single printed character from the sheet of paper; positioning means operated by said operating means for positively locking the single support in its printing position; first means for advancing the typing ribbon when the printing device operates in the second operating mode; and second means for advancing said correcting ribbon only in response to the alternate movement of said single support between the rest position and the position for deleting, wherein said positioning means enables said single support to perform its motion when deletion of the characters is being carried out, wherein said positioning means comprise a positioning cam and said operating means comprise an electromagnetic actuator operating on a cam follower of said single support through said positioning cam, wherein said electromagnetic actuator is actuatable in an energized state by an initial current for causing the single support to raise from the rest position to the printing position and wherein said positioning cam, during said second operating mode locks said single support for causing the typing ribbon to be locked in front of the printing point and said electromagnetic actuator to be held actuated by means of a holding current, which is less than said initial current, wherein said positioning cam is operated by said electromagnetic actuator and comprises a slot cooperative with said cam follower for locking said single support in said second operating mode when repeated printing is occurring and wherein said cam follower releases said cam when correction of the printed characters is being carried out.

32. In a printing and correcting device for printing machines comprising a platen including a printing point, a carriage movable with respect to the platen, fixing means for movably supporting a printing ribbon cartridge on said carriage, wherein said printing ribbon cartridge has two guide arms to position an external portion of a printing ribbon adjacent to said platen, a correcting field, a pair of guide members for locating said correcting field beneath said external portion of printing ribbon of a printing ribbon cartridge supported by said fixing means, and first and second electromagnetic actuators each actuatable from an inoperative state to an operative state, respectively, for causing the guide arms of the cartridge supported by said fixing means to be moved from a rest position enabling the printing point to be seen, to a printing position, wherein the external portion of the printing ribbon is located in front of the printing point for the printing of characters, and to a correcting position, wherein the correcting field is located in front of the printing point for the correction of printed characters and said external portion of printing ribbon is located above said printing point, the improvement comprising:
 a cam follower element operatively connected with said cartridge;
 a cam lever fulcrumed on said carriage and including a rest profile, an active profile, a further profile defining a slot together with said active profile, and an operative portion for being operated by said first electromagnetic actuator; and
 spring means for causing said cam follower element to contact the rest and the active profile of said cam lever;
 wherein, in the inoperative state of said first and second electromagnetic actuators, said cam follower element cooperates with the rest profile of said cam lever and causes the guide arms of said cartridge to be held in said rest position, wherein said second electromagnetic actuator, in its operative state and in the inoperative state of said first electromagnetic actuator, causes said cam follower element to release said rest profile jointly with the movement of said pair of guide members to said correcting position; and
 wherein said first electromagnetic actuator, in its operative state and in the inoperative state of said second electromagnetic actuator, rotates said cam lever to cause the cam follower element to cooperate with the active profile of said cam lever to raise the guide arms of the cartridge in said printing position and to cause said cam follower element to be engaged in said slot for positively holding said guide arms with the printing ribbon in said printing position, without ribbon oscillation during the operative state of said first electromagnetic actuator.

* * * * *